United States Patent
Cha

(10) Patent No.: US 9,461,283 B2
(45) Date of Patent: Oct. 4, 2016

(54) BATTERY MODULE

(75) Inventor: In-Hwan Cha, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 563 days.

(21) Appl. No.: 13/612,693

(22) Filed: Sep. 12, 2012

(65) Prior Publication Data

US 2013/0224540 A1 Aug. 29, 2013

Related U.S. Application Data

(60) Provisional application No. 61/603,159, filed on Feb. 24, 2012.

(51) Int. Cl.
| | |
|---|---|
| *H01M 10/50* | (2006.01) |
| *H01M 2/10* | (2006.01) |
| *H01M 10/615* | (2014.01) |
| *H01M 10/6556* | (2014.01) |
| *H01M 10/6567* | (2014.01) |
| *H01M 10/625* | (2014.01) |
| *H01M 10/647* | (2014.01) |

(52) U.S. Cl.
CPC ......... *H01M 2/1077* (2013.01); *H01M 10/615* (2015.04); *H01M 10/6556* (2015.04); *H01M 10/6567* (2015.04); *H01M 10/625* (2015.04); *H01M 10/647* (2015.04)

(58) Field of Classification Search
CPC .. H01M 10/60; H01M 10/61; H01M 10/613; H01M 10/615; H01M 10/625; H01M 10/647; H01M 10/617; H01M 10/653; H01M 10/6556; H01M 10/6557; H01M 10/6566; H01M 10/6567; H01M 10/6568; H01M 2/1077
See application file for complete search history.

(56) References Cited

U.S. PATENT DOCUMENTS

| | | | |
|---|---|---|---|
| 2006/0132101 A1* | 6/2006 | Ambrosio et al. | ............ 320/150 |
| 2009/0061299 A1* | 3/2009 | Uchida et al. | ................ 429/156 |
| 2009/0075158 A1 | 3/2009 | Rudorff et al. | |
| 2009/0311586 A1* | 12/2009 | Chung | ................ H01M 2/1077 429/120 |

(Continued)

FOREIGN PATENT DOCUMENTS

| | | |
|---|---|---|
| CN | 101385187 A | 3/2009 |
| DE | 10 2008 059 961 A1 | 6/2010 |
| DE | 10 2009 058 880 A1 | 6/2011 |

(Continued)

OTHER PUBLICATIONS

EPO Search Report dated Jul. 29, 2013, for corresponding European Patent application 12198153.4, (5 pages).

(Continued)

*Primary Examiner* — Ula C Ruddock
*Assistant Examiner* — Lisa S Park
(74) *Attorney, Agent, or Firm* — Lewis Roca Rothgerber Christie LLP

(57) ABSTRACT

A battery module capable of easily discharging, to an outside thereof, condensate water produced on a surface of a heat exchange member contacting the battery module when the battery module is heated. A battery module includes a plurality of battery cells electrically connected to one another; and a heat exchange member at bottom surfaces of the battery cells, and the heat exchange member includes an upper surface facing the bottom surfaces of the battery cells and having at least one groove formed therein.

16 Claims, 5 Drawing Sheets

(56) References Cited

U.S. PATENT DOCUMENTS

2011/0104545 A1* 5/2011 Meintschel et al. .......... 429/120
2011/0262546 A1 10/2011 Legname et al.

FOREIGN PATENT DOCUMENTS

| JP | 2007-280890 | 10/2007 |
| JP | 2010-536127 | 11/2010 |
| KR | 10-2002-0018826 A | 3/2002 |
| KR | 10-2008-0083893 A | 9/2008 |
| KR | 10-2008-0095369 | 10/2008 |
| KR | 10-2011-0030202 A | 3/2011 |
| WO | WO 2010/063366 A1 | 6/2010 |

OTHER PUBLICATIONS

KIPO Office action dated Mar. 22, 2016, corresponding to Korean Patent application 10-2013-0019314, (10 pages).

SIPO Office action dated Mar. 28, 2016, with English translation, for corresponding Chinese Patent application 201210459288.X, (13 pages).

* cited by examiner

BATTERY MODULE

CROSS-REFERENCE TO RELATED APPLICATION

This application claims priority to and the benefit of U.S. Provisional Application No. 61/603,159, filed on Feb. 24, 2012 in the United States Patent & Trademark Office, the entire content of which is incorporated herein by reference.

BACKGROUND

1. Field

Aspects of embodiments of the present invention relate to a battery module.

2. Description of the Related Art

In general, battery cells are used as energy sources for mobile devices, electric vehicles, hybrid electric vehicles, and the like. The battery cells are used by variously changing their shapes depending on the kind of external device having the battery cells applied thereto.

A large-capacity battery module is configured by electrically connecting a plurality of battery cells to one another so as to increase power and capacity when long-time and high-power driving is necessary, such as for an electric vehicle or hybrid electric vehicle having high power consumption. The battery module can increase its output voltage or current according to the number of battery cells built therein.

The power and capacity of the battery module is considerably influenced by a temperature at which the battery module is used. For example, the power of the battery module used in a low-temperature area is typically lower than that of the battery module used in a normal-temperature area. Therefore, when the battery module is intended to be used in a low-temperature area, the battery module is designed in consideration of not only cooling, but also heating.

SUMMARY

According to an aspect of embodiments of the present invention, a battery module is capable of easily discharging, to an outside thereof, condensate water produced on a surface of a heat exchange member contacting the battery module when the battery module is heated. According to another aspect of embodiments of the present invention, a battery module has improved insulation performance between battery cells.

According to one embodiment of the present invention, a battery module includes: a plurality of battery cells electrically connected to one another; and a heat exchange member at bottom surfaces of the battery cells, and the heat exchange member includes an upper surface facing the bottom surfaces of the battery cells and having at least one groove formed therein.

The battery cells may be supported on the upper surface of the heat exchange member.

In one embodiment, the battery cells are arranged in a first direction, and the at least one groove extends in a lengthwise direction substantially perpendicular to the first direction from a first side of the heat exchange member to a second side of the heat exchange member and is downwardly inclined in the lengthwise direction.

The at least one groove may extend from the first side to the second side at a location corresponding to the plurality of battery cells.

The at least one groove may include a plurality of grooves extending from the first side to the second side at respective locations corresponding to faces of adjacent battery cells of the plurality of battery cells facing the first direction.

The at least one groove may include a plurality of grooves extending from the first side to the second side at respective locations corresponding to opposing faces of pairs of adjacent battery cells of the plurality of battery cells.

In one embodiment, the battery module further includes a pair of end plates at outer ends of the plurality of battery cells, and a groove of the at least one groove extends from the first side to the second side at a location corresponding to a face of an end plate of the pair of end plates and an opposing face of an adjacent battery cell of the plurality of battery cells.

In one embodiment, the battery cells are arranged in a first direction, and the at least one groove extends in the first direction from a first side of the heat exchange member to a second side of the heat exchange member and is downwardly inclined in the first direction. The upper surface of the heat exchange member may have at least one another groove extending in a lengthwise direction substantially perpendicular to the first direction from a third side of the heat exchange member to a fourth side of the heat exchange member and downwardly inclined in the lengthwise direction.

In one embodiment, the at least one groove extends in a lengthwise direction from a first side of the heat exchange member to a second side of the heat exchange member and is downwardly inclined in the lengthwise direction, and a depth from the upper surface of the at least one groove at the second side is 30% to 60% of a height of the heat exchange member. The at least one groove substantially may not have a depth from the upper surface at the first side.

In one embodiment, the heat exchange member further includes an inlet for receiving a heat exchange medium, and an outlet for discharging the heat exchange medium.

The at least one groove may extend in a lengthwise direction from a first side of the heat exchange member to a second side of the heat exchange member and may be downwardly inclined in the lengthwise direction, and the inlet may be at the first side, and the outlet may be at the second side.

The at least one groove may be connected to the outlet at the second side.

The heat exchange medium may include at least one of ethylene glycol or propylene glycol.

The battery cells may include terminals at respective sides opposite the bottom surfaces.

The upper surface of the heat exchange member may contact the bottom surfaces of the battery cells.

The battery module may be configured for driving a motor of an electric vehicle or a hybrid electric vehicle.

According to another embodiment of the present invention, a battery module includes: a plurality of battery cells electrically connected to one another; and a heat exchange member provided to bottom surfaces of the battery cells, wherein at least one groove is formed on a surface of the heat exchange member contacting the bottom surfaces of the plurality of battery cells.

The bottom surface of the battery cell may be provided opposite to a cap plate having terminal parts provided thereto, and the heat exchange member may be provided to support the bottom surfaces of the battery cells.

The grooves may be formed to be downwardly inclined from one side to the other side between the battery cells, such that condensate water is discharged through the grooves.

The grooves may be formed between the battery cells, respectively, or may be formed between a certain number (e.g., every predetermined number) of the battery cells, respectively. Alternatively, one groove may be formed for each battery module.

An inlet through which a heat exchange medium is flowed in the heat exchange member may be provided at one side of the heat exchange member, and an outlet through which the heat exchange medium is discharged from the heat exchange member may be provided at the other side of the heat exchange member.

The groove may be formed to be downwardly inclined from the side of the inlet to the side of the outlet.

The inclination height of the groove at the side of the outlet may be formed to be 30 to 60% of the height of the heat exchange member.

The heat exchange medium as a refrigerant may include at least one of ethylene glycol and propylene glycol.

According to an aspect of embodiments of the present invention, a battery module can easily discharge, to an outside thereof, condensate water produced on a surface of a heat exchange member contacting the battery module when the battery module is heated, such that the insulation performance between battery cells can be maintained and a short circuit between the battery cells may be prevented or substantially prevented. As such, a battery module according to embodiments of the present invention is applicable as a motor-driving power source for propelling a hybrid vehicle or an electric vehicle.

BRIEF DESCRIPTION OF THE DRAWINGS

The accompanying drawings, together with the specification, illustrate some exemplary embodiments of the present invention, and, together with the description, serve to explain principles and aspects of the present invention.

DETAILED DESCRIPTION

Figure 1:
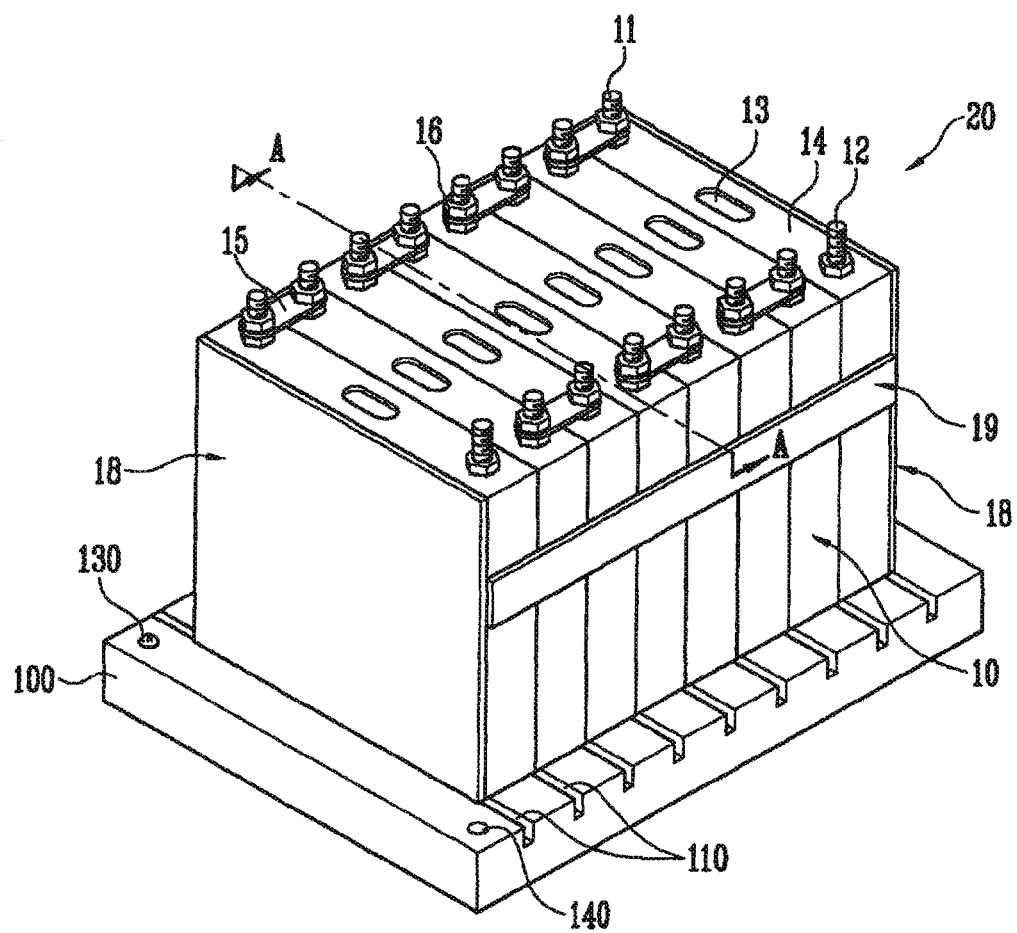
FIG. 1 is a perspective view of a battery module according to an embodiment of the present invention.

In the following detailed description, certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it may be directly on the another element or indirectly on the another element with one or more intervening elements interposed therebetween. Also, when an element is referred to as being "connected to" another element, it may be directly connected to the another element or indirectly connected to the another element with one or more intervening elements connected therebetween. Hereinafter, like reference numerals refer to like elements. In the drawings, the thickness or size of layers or components may be exaggerated for clarity and not necessarily drawn to scale.

FIG. 1 is a perspective view of a battery module according to an embodiment of the present invention.

Referring to FIG. 1, a battery module 20 according to an embodiment of the present invention includes a plurality of battery cells 10 electrically connected to one another, and a heat exchange member 100 provided at bottom surfaces 10a of the battery cells 10. At least one groove 110 is formed on the surface of the heat exchange member 100 contacting the bottom surfaces 10a (see FIG. 4) of the plurality of battery cells 10. In one embodiment, the groove 110 formed in the heat exchange member 100 is formed to be downwardly inclined from one side to the other side between the battery cells 10.

In one embodiment, the bottom surface of the battery cell 10 is provided opposite to a cap plate 14 provided with terminal parts 11 and 12 of the battery cell 10. The heat exchange member 100, in one embodiment, supports the bottom surfaces 10a of the battery cells 10.

In one embodiment, an inlet 130 through which a heat exchange medium is flowed in the heat exchange member 100 is provided at one side of the heat exchange member 100, and an outlet 140 through which the heat exchange medium is discharged from the heat exchange member 100 is provided at the other side of the heat exchange member 100. Although not shown in the drawings, a flow path along which the heat exchange medium can move is formed in the inside of the heat exchange member 100. The heat exchange medium, in one embodiment, may include, as a refrigerant, at least one of ethylene glycol and propylene glycol.

When the battery cell 10 is intended to be cooled down, the heat exchange medium colder than the battery cell 10 is supplied to the heat exchange member 100 contacting the battery cell 10. When the battery cell 10 is intended to be heated, the heat exchange medium hotter than the battery cell 10 is supplied to the heat exchange member 100. In this case, the temperature of the battery cell 10 is increased due to the heat exchange medium that is hotter than the battery cell 10. However, when the battery cell 10 is heated, the temperature of the battery cell 10 is lower than that of the heat exchange medium, and hence condensate water may be produced on the surface of the heat exchange member 100 contacting the battery cell 10. The condensate water produced as described above degrades the insulating performance between the battery cells 10, and a short circuit between the battery cells 10 may occur.

Thus, in the heat exchange member 100 according to an embodiment of the present invention, the grooves 110 are formed such that the condensate water produced on the surface of the heat exchange member 100 contacting the battery cells 10 can be easily discharged. The grooves 110, in one embodiment, are formed between the battery cells 10, respectively, such that the condensate water produced on the surface of the heat exchange member 100 can be easily discharged from the heat exchange member 100. As such, a battery module according to embodiments of the present invention is applicable as a motor-driving power source for propelling a hybrid vehicle or an electric vehicle.

The battery module 20 according to an embodiment of the present invention is described further below.

The battery module 20 according to one embodiment has a configuration in which the plurality of battery cells 10 are arranged in one direction, and each of the battery cells 10 has the cap plate 14 provided with the terminal parts 11 and 12 formed on the top surface thereof. Each of the battery cells 10 has the bottom surface 10*a* (see FIG. 4) provided opposite to the cap plate 14, and the heat exchange member 100 may be provided to support the bottom surfaces of the battery cells 10.

The battery cell 10 may include a battery case having one open side, and an electrode assembly and an electrolyte accommodated in the battery case. The electrode assembly and the electrolyte generate energy by an electrochemical reaction therebetween, and the open side of the battery case is sealed by the cap plate 14. The cap plate 14 may be provided with the terminal parts 11 and 12 and a vent part 13. The terminal parts 11 and 12 may be positive and negative electrode terminals 11 and 12 having different polarities from each other. The vent part 13 is a safety vent of the battery cell 10 and acts as a path through which gas generated inside the battery cell 10 is exhausted to the outside of the battery cell 10. The positive and negative electrodes terminals 11 and 12 of neighboring battery cells 10 may be electrically connected to each other through a bus bar 15, and the bus bar 15 may be fixed to the positive and negative electrode terminals 11 and 12 using a member such as a nut 16.

In one embodiment, the plurality of battery cells 10 are aligned in one direction, and one or more plates 18 and 19 may be used to fix the alignment state of the battery cells 10. The plates 18 and 19 may include a pair of end plates 18 facing wide surfaces of the battery cells, and a pair of side plates 19 connected to the end plates 18 so as to be adjacent to side surfaces of the battery cells 10. The plates 18 and 19 are used to fix the plurality of battery cells 10, and may be variously modified according to a design of the battery module 20.

Figure 2A:
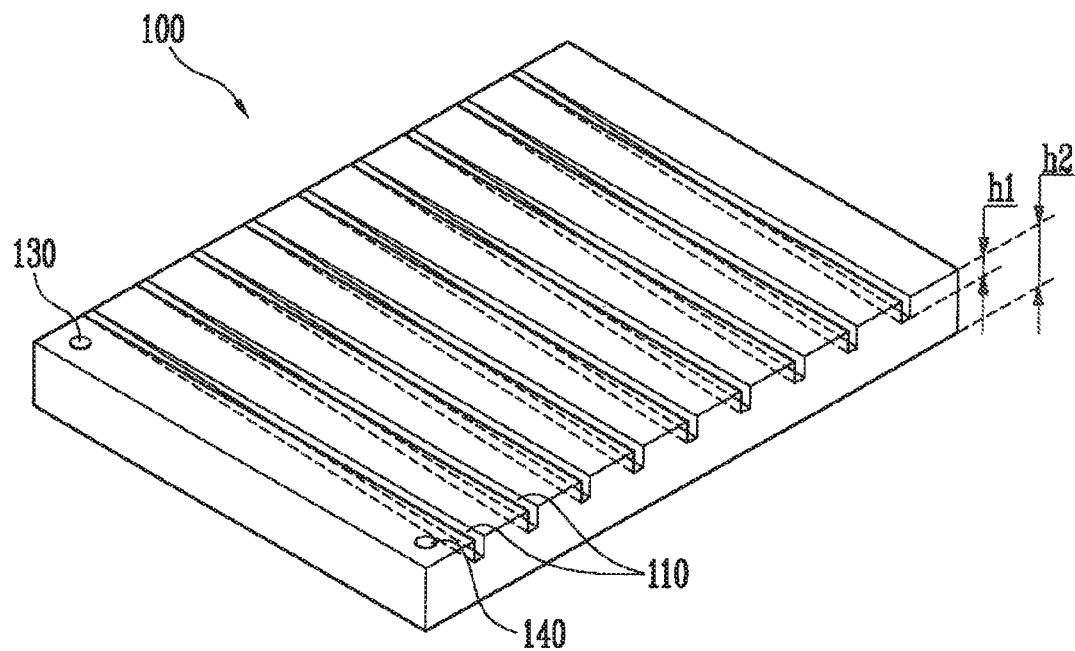
FIG. 2A is a perspective view of a heat exchange member of the battery module of FIG. 1, according to an embodiment of the present invention.

FIG. 2A is a perspective view of the heat exchange member 100 according to an embodiment of the present invention.

Referring to FIG. 2A, the heat exchange member 100 according to one embodiment is provided to support the bottom surfaces 10*a* of the battery cells 10 (see FIGS. 1 and 4), and may be formed in the shape of a plate having a thickness (e.g., a predetermined thickness). The heat exchange member 100, in one embodiment, is generally used to control heat generated from the battery cells 10. Although not shown in the drawings, a flow path along which a heat exchange medium is flowed in the heat exchange member 100 is provided in the heat exchange member 100 such that the heat exchange member 100 can perform a heat exchange with the battery cells 10 (see FIG. 1).

When the temperature of the heat exchange medium is high, condensate water is produced on the surface of the heat exchange member 100. At least one groove 110 is formed on the heat exchange member 100 such that the condensate water is discharged to the outside of the heat exchange member 100 therethrough. The grooves 110, in one embodiment, are formed to be downwardly inclined from one side to the other side between the battery cells 10. In one embodiment, the grooves 110 are formed between the battery cells 10, respectively. That is, in one embodiment, the grooves 110 extend from the first side to the second side at respective locations corresponding to faces of adjacent ones of the battery cells 10 facing the one direction. In one embodiment, for example, nine grooves 110 may be formed in the surface of the heat exchange member 100 of the battery module 20 having eight battery cells 10.

In one embodiment, the inlet 130 through which a heat exchange medium is flowed in the heat exchange member 100 is provided at one side of the heat exchange member 100, and the outlet 140 through which the heat exchange medium is discharged from the heat exchange member 100 is provided at the other side of the heat exchange member 100. The groove 110, in one embodiment, may be formed to be downwardly inclined from the side of the inlet 130 to the side of the outlet 140.

In one embodiment, an inclination height h1 (i.e. a depth from the surface of the heat exchange member 100 contacting the bottom surfaces 10*a* of the battery cells 10) of the groove 110 at the side of the outlet 140 may be formed to be 30 to 60% of a height h2 of the heat exchange member 100. If the inclination height h1 of the groove 110 at the side of the outlet 140 is formed to be less than 30% of the height h2 of the heat exchange member 100, a sufficiently inclined surface may not be formed, and therefore, it is more difficult for the condensate water produced on the surface of the heat exchange member 100 to be discharged. If the inclination height hi of the groove 110 at the side of the outlet 140 is formed to exceed 60% of the height h2 of the heat exchange member 100, the heat exchange member 100 may not secure a sufficient space in which the flow path along which the heat exchange medium is flowed in the heat exchange member 100 is to be formed in the heat exchange member 100. Thus, in one embodiment, the inclination height h1 of the groove 110 at the side of the outlet 140 is formed to be 30 to 60% of the height h2 of the heat exchange member 100.

Figure 2B:
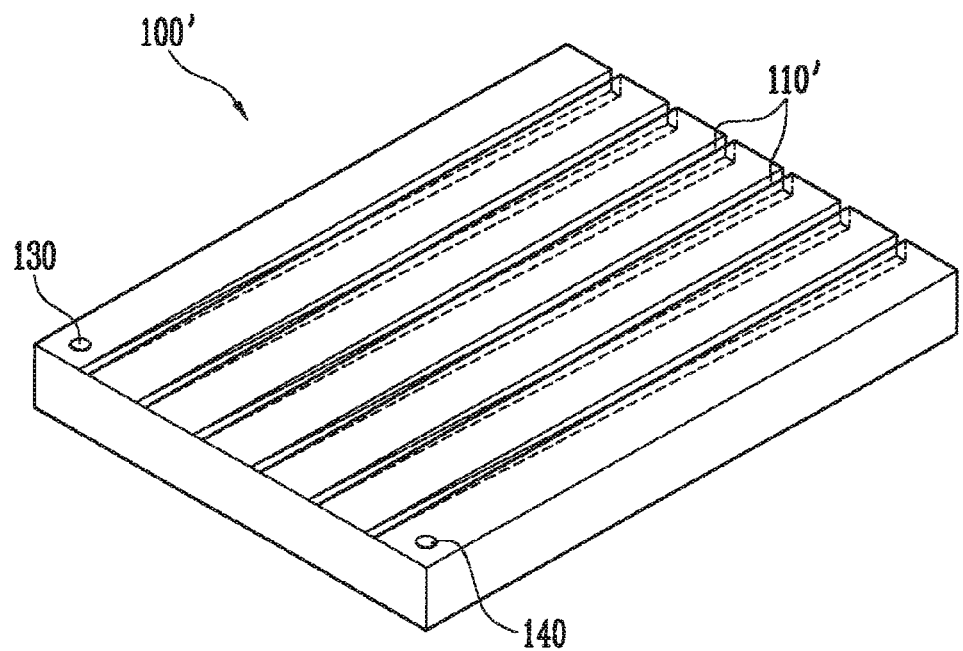
FIG. 2B is a perspective view of a heat exchange member of a battery module, according to another embodiment of the present invention.

FIG. 2B is a perspective view of a heat exchange member 100' of a battery module, according to another embodiment of the present invention.

Referring to FIG. 2B, in the heat exchange member 100' according to one embodiment, one or more grooves 110' are formed similar to the grooves 110 described above with respect to the heat exchange member 100. In the heat exchange member 100', the inlet 130 through which a heat exchange medium is flowed in the heat exchange member 100', and the outlet 140 through which the heat exchange medium is discharged from the heat exchange member 100' are both provided at a first end of the heat exchange member 100', and the one or more grooves 110' are formed to be downwardly inclined from the first end to another end of the heat exchange member 100' opposite the first end.

Figure 3A:
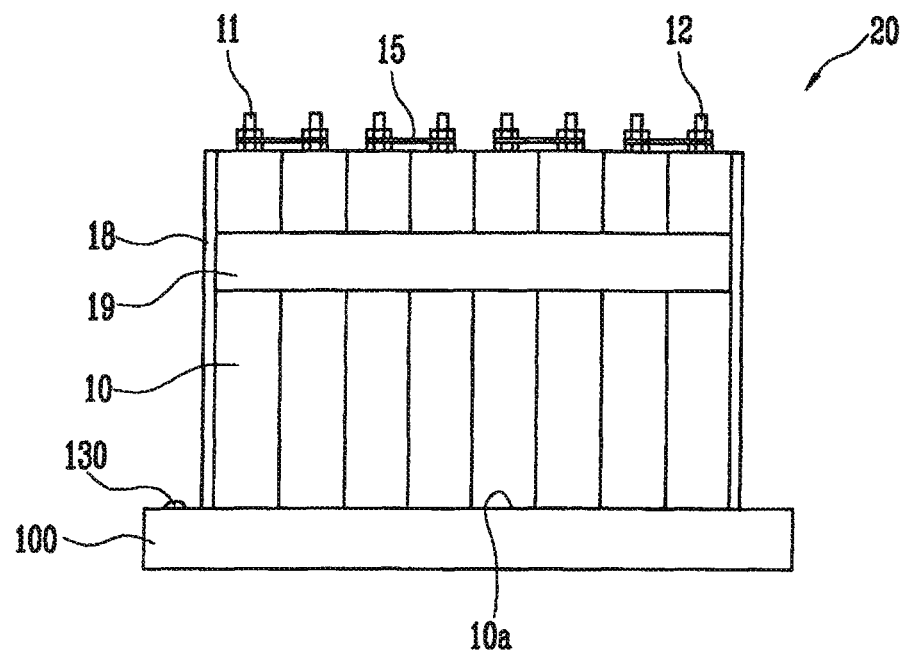
FIG. 3A is a side view of the battery module of FIG. 1, viewed from a first side.
Figure 3B:
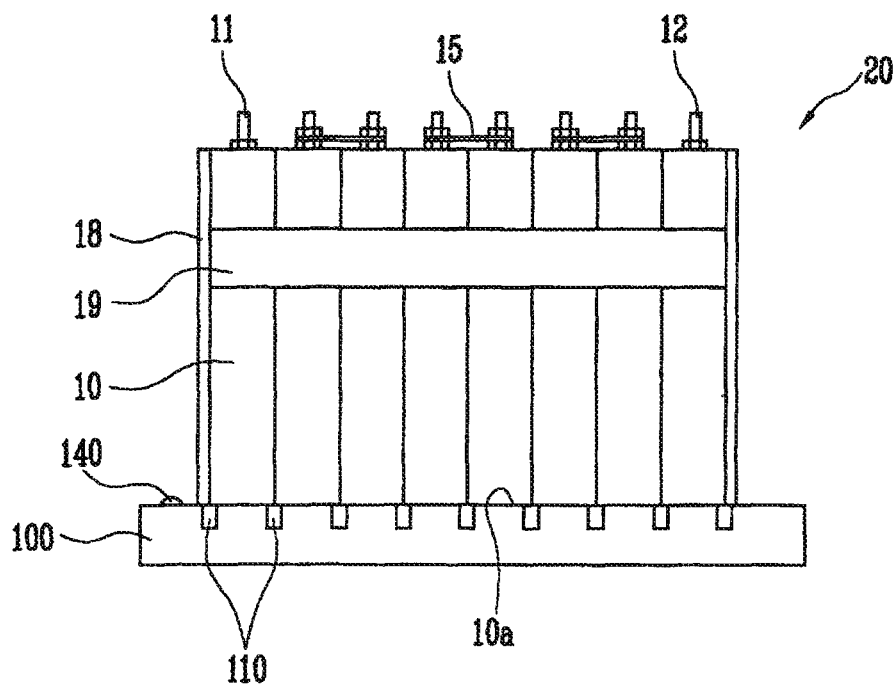
FIG. 3B is a side view of the battery module of FIG. 1, viewed from a second side that is opposite the first side of FIG. 3A.

FIG. 3A is a side view of the battery module 20, viewed from a first side. FIG. 3B is a side view of the battery module 20 viewed from a second side opposite the first side of FIG. 3A.

Referring to FIGS. 3A and 3B, in one embodiment, the grooves 110 formed in the surface of the heat exchange member 100 contacting the bottom surfaces 10*a* (see FIG. 4) of the battery cells 10 are not viewable from the side of the battery cell 10 at which the inlet 130 is formed (see FIG. 3A). That is, in one embodiment, the groove 110 does not have a depth from the surface of the heat exchange member 100 contacting the bottom surfaces 10*a* of the battery cells 10 at the side at which the inlet 130 is formed. The grooves 110 having a depth (e.g., a predetermined depth) are viewable from the side of the battery cell 10, at which the outlet 140 is formed (see FIG. 3B).

The grooves 110, in one embodiment, are formed to be downwardly inclined from one side to the other side between the battery cells 10, and the condensate water produced on the surface of the heat exchange member 100 can be easily discharged through the grooves 110. In one embodiment, the inclined surface of the groove 110 may be formed to be downwardly inclined from the side of the inlet 130 to the side of the outlet 140, and an end of the groove 110 through which the condensate water is discharged to the outside of the heat exchange member 100 may be connected to the outlet 140. Accordingly, the battery module 20 may have a structure in which the condensate water produced on the surface of the heat exchange member 100 is discharged to the outside of the heat exchange member 100 through the outlet 140.

In one embodiment, the grooves 110 are formed between the respective battery cells 10, such that the condensate water produced on the surface of the heat exchange member 100 contacting the bottom surfaces 10a of the battery cells 10 can be easily discharged to the outside of the heat exchange member 100. In one embodiment, the battery cells 10 are arranged in a first direction, and the grooves 110 extend in a lengthwise direction substantially perpendicular to the first direction from a first side of the heat exchange member 100 to a second side of the heat exchange member 100 and are downwardly inclined in the lengthwise direction.

Figure 3C:
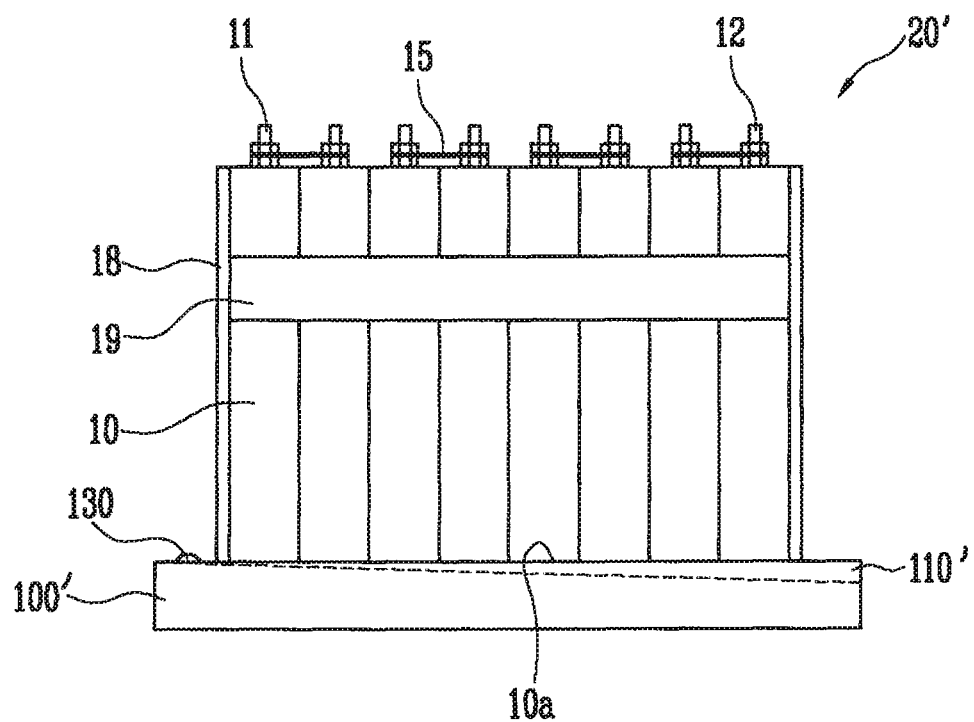
FIG. 3C is a side view of a battery module, according to another embodiment of the present invention.

FIG. 3C is a side view of a battery module 20', according to another embodiment of the present invention. In one embodiment, the battery module 20' includes the heat exchange member 100' described above with respect to FIG. 2B. In the battery module 20', the battery cells 10 are arranged in a first direction, and the grooves 110' extend in the first direction from a first side of the heat exchange member 100' to a second side of the heat exchange member 100' and are downwardly inclined in the first direction.

Figure 4:
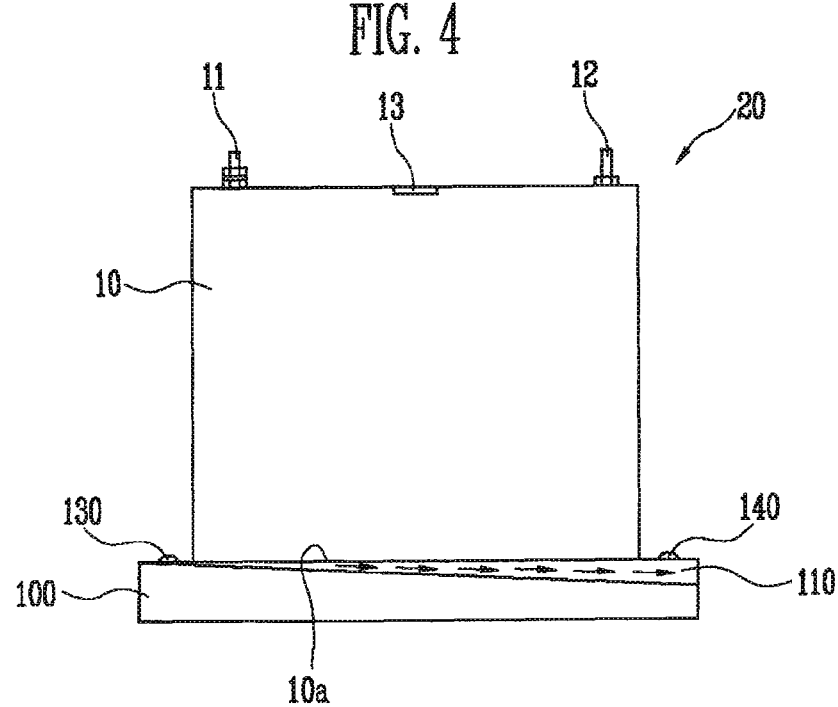
FIG. 4 is a sectional view of the battery module of FIG. 1, taken along the line A-A.

FIG. 4 is a sectional view of the battery module 20, taken along the line A-A of FIG. 1.

Referring to FIG. 4, the grooves 110, in one embodiment, are formed to be downwardly inclined from one side to the other side between the battery cells 10, such that the condensate water can be easily discharged to the outside of the heat exchange member 100 through the grooves 110. In one embodiment, the inlet 130 is formed at one end between the battery cells 10 and the outlet 140 is formed at the other end between the battery cells 10. Accordingly, the condensate water produced on the surface of the heat exchange member 100 can be easily discharged to the side of the outlet 140.

In one embodiment, the inclination height of the groove 110 at the side of the outlet 140 may be formed to be 30 to 60% of the height of the heat exchange member 100. If the inclination height of the groove 110 at the side of the outlet 140 is formed to be less than 30% of the height of the heat exchange member 100, a sufficiently inclined surface may not be formed, and therefore, it may be difficult for the condensate water produced on the surface of the heat exchange member 100 to be discharged. If the inclination height of the groove 110 at the side of the outlet 140 is formed to exceed 60% of the height of the heat exchange member 100, the heat exchange member 100 may not secure a sufficient space in which the flow path along which the heat exchange medium is flowed in the heat exchange member 100 is to be formed in the heat exchange member 100. Thus, in one embodiment, the inclination height h1 (see FIG. 2A) of the groove 110 at the side of the outlet 140 is formed to be 30 to 60% of the height h2 (see FIG. 2A) of the heat exchange member 100.

Figure 5:
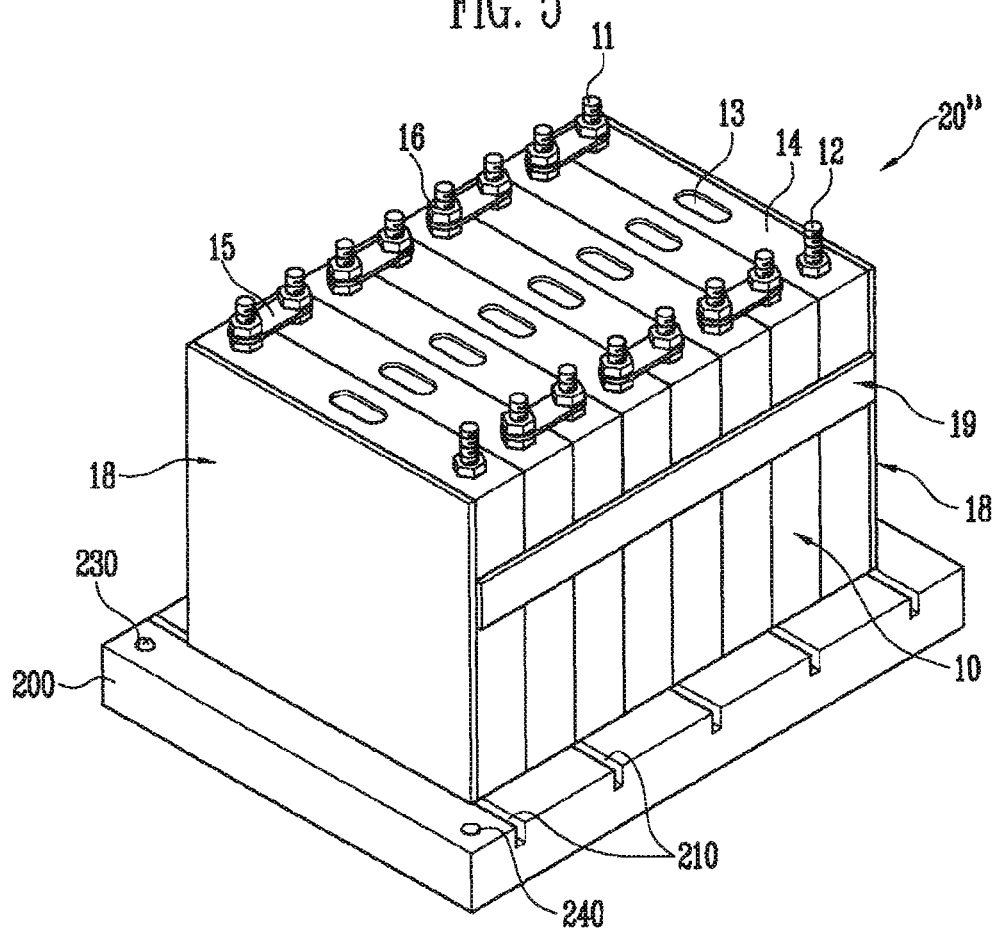
FIG. 5 is a perspective view of a battery module according to another embodiment of the present invention.

FIG. 5 is a perspective view of a battery module according to another embodiment of the present invention.

Referring to FIG. 5, a battery module 20" according to another embodiment of the present invention includes the plurality of battery cells 10 electrically connected to one another, and a heat exchange member 200 provided at bottom surfaces of the battery cells 10. At least one groove 210 is formed on the surface of the heat exchange member 200 contacting the bottom surfaces 10a (see FIG. 4) of the plurality of battery cells 10.

The grooves 210, in one embodiment, are formed to be downwardly inclined from one side to the other side between the battery cells 10, such that the condensate water produced on the surface of the heat exchange member 200 can be easily discharged to the outside of the heat exchange member 200 through the grooves 210. The grooves 210 may be formed at intervals between a number (e.g., every predetermined number) of the battery cells 10, respectively. In one embodiment, as shown in FIG. 5, the grooves 210 are formed at intervals between every two of the battery cells 10, respectively. That is, the grooves 210 may be at respective locations corresponding to opposing faces of pairs of adjacent ones of the battery cells 10.

In this case, condensate water produced on the surface of the heat exchange member 200 contacting the bottom surfaces of the battery cells 10 between which the groove 210 is not formed may be discharged through the groove 210 formed between a pair of adjacent battery cells 10.

In one embodiment, an inlet 230 through which a heat exchange medium is flowed in the heat exchange member 200 is provided at one side of the heat exchange member 200, and an outlet 240 through which the heat exchange medium is discharged from the heat exchange member 200 is provided at the other side of the heat exchange member 200. In one embodiment, an end of the groove 210 may be connected to the outlet 240. Accordingly, the condensate water can be discharged through the outlet 240.

In embodiments of the present invention, it has been described that the grooves are formed between the battery cells or between every two of the battery cells, respectively. However, the shape and number of the grooves is not limited in other embodiments of the present invention. For example, in another embodiment, one groove may be formed for each module.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
   a plurality of battery cells electrically connected to one another; and
   a heat exchange member at bottom surfaces of the battery cells,
   wherein the heat exchange member comprises a planar upper surface facing the bottom surfaces of the battery cells and having at least one groove formed therein to a depth below the planar upper surface, the at least one groove extending from a first side of the heat exchange member to a second, side of the heat exchange member and being downwardly inclined such that the depth from the planar upper surface is greater at the second side than at the first side, and wherein the bottom surfaces are bottommost surfaces of respective ones of the battery cells, the bottommost surfaces being supported on the planar upper surface of the heat exchange member outside the at least one groove.

2. The battery module of claim 1, wherein the battery cells are arranged in a first direction, and the at least one groove extends in a lengthwise direction substantially perpendicular to the first direction from the first side of the heat exchange member to the second side of the heat exchange member and is downwardly inclined in the lengthwise direction.

3. The battery module of claim 2, wherein the at least one groove extends from the first side to the second side at a location corresponding to the plurality of battery cells.

4. The battery module of claim 3, wherein the at least one groove extends from the first side to the second side at respective locations corresponding to faces of adjacent battery cells of the plurality of battery cells facing the first direction.

5. The battery module of claim 3, wherein the at least one groove extends from the first side to the second side at respective locations corresponding to opposing faces of pairs of adjacent battery cells of the plurality of battery cells.

6. The battery module of claim 2, further comprising a pair of end plates at outer ends of the plurality of battery cells, wherein a groove of the at least one grooves extends from the first side to the second side at a location corresponding to a face of an end plate of the pair of end plates and an opposing face of an adjacent battery cell of the plurality of battery cells.

7. The battery module of claim 1, wherein the battery cells are arranged in a first direction and the at least one groove extends in the first direction from the first side of the heat exchange member to the second side of the heat exchange member and is downwardly inclined in the first direction.

8. The battery module of claim 1,
wherein the at least one groove extends in a lengthwise direction from a first side of the heat exchange member to a second side of the heat exchange member and is downwardly inclined in the lengthwise direction, and
wherein the depth from the upper surface of the at least one groove at the second side is 30% to 60% of a height of the heat exchange member.

9. The battery module of claim 8, wherein the at least one groove substantially does not have a depth from the upper surface at the first side.

10. The battery module of claim 1, wherein the heat exchange member further comprises an inlet for receiving a heat exchange medium, and an outlet for discharging the heat exchange medium.

11. The battery module of claim 10,
wherein the at least one groove extends in a lengthwise direction from the first side of the heat exchange member to the second side of he heat exchange member and is downwardly inclined in the lengthwise direction, and
wherein the inlet is at the first side, and the outlet is at the second side.

12. The battery module of claim 11, wherein the at least one groove is connected to the outlet at the second side.

13. The battery module of claim 10, wherein the heat exchange medium comprises at least one of ethylene glycol or propylene glycol.

14. The battery module of claim 1, wherein the battery cells comprise terminals at respective sides opposite the bottom surfaces.

15. The battery module of claim 1, wherein the upper surface of the heat exchange member contacts the bottom surface of the battery cells.

16. The battery module of claim 1, wherein the battery module is configured for driving a motor of an electric vehicle or a hybrid electric vehicle.

* * * * *

UNITED STATES PATENT AND TRADEMARK OFFICE
CERTIFICATE OF CORRECTION

PATENT NO. : 9,461,283 B2
APPLICATION NO. : 13/612693
DATED : October 4, 2016
INVENTOR(S) : In-Hwan Cha It is certified that error appears in the above-identified patent and that said Letters Patent is hereby corrected as shown below:

In the Claims

Column 8, Line 67, Claim 1     delete "second," and insert -- second --

Column 9, Line 29, Claim 6     delete "grooves" and insert -- groove --

Column 9, Line 35, Claim 7     delete "direction" and insert -- direction, --

Column 10, Line 19, Claim 11     delete "he" and insert -- the --

Column 10, Line 34, Claim 15     delete "surface" and insert -- surfaces --

Signed and Sealed this
Fourth Day of June, 2019

Andrei Iancu
*Director of the United States Patent and Trademark Office*